(12) United States Patent
Erlenmaier et al.

(10) Patent No.: US 8,574,140 B2
(45) Date of Patent: Nov. 5, 2013

(54) LASER NOZZLE CHANGING DEVICE

(75) Inventors: Werner Erlenmaier, Gerlingen (DE);
Frank Schmauder, Metzingen (DE);
Armin Felber, Freienbach (CH); Reto Gedeon, Root (CH)

(73) Assignee: TRUMPF Maschinen AG, Baar (CH)

( * ) Notice: Subject to any disclaimer, the term of this patent is extended or adjusted under 35 U.S.C. 154(b) by 434 days.

(21) Appl. No.: 12/350,410

(22) Filed: Jan. 8, 2009

(65) Prior Publication Data

US 2009/0181837 A1    Jul. 16, 2009

(30) Foreign Application Priority Data

Jan. 12, 2008  (EP) .................................... 08000521

(51) Int. Cl.
*B23Q 3/157*  (2006.01)
*B23K 26/00*  (2006.01)
*B23K 26/36*  (2006.01)

(52) U.S. Cl.
USPC ........ 483/16; 483/2; 483/13; 483/69; 483/58; 483/61; 483/67

(58) Field of Classification Search
USPC ......... 483/16, 2–3, 13, 69, 58, 59, 60, 61, 65, 483/66, 67; 219/121.6, 121.63, 121.67, 219/121.73, 121.75, 121.68, 121.74
See application file for complete search history.

(56) References Cited

U.S. PATENT DOCUMENTS

| | | | |
|---|---|---|---|
| 8,360,944 B2 * | 1/2013 | Erlenmaier et al. | 483/16 |
| 8,366,593 B2 * | 2/2013 | Schmauder | 483/16 |
| 8,439,811 B2 * | 5/2013 | Erlenmaier et al. | 483/16 |
| 2004/0167001 A1 * | 8/2004 | Hagihara et al. | 483/16 |

FOREIGN PATENT DOCUMENTS

| | | |
|---|---|---|
| DE | 10056330 | 3/2002 |
| DE | 102006028730 | 7/2007 |
| EP | 1454698 | 9/2004 |
| EP | 1602438 | 12/2005 |
| EP | 1602439 | 12/2005 |
| FR | 2547230 | 12/1984 |
| JP | 58192731 | 11/1983 |
| JP | 05-084586 A * | 4/1993 |
| JP | 6-23580 | 2/1994 |
| JP | 11-138373 A * | 5/1999 |
| JP | 2002018671 A | 1/2002 |

OTHER PUBLICATIONS

Machine Translation of JP 05-084586-A, which Japanese patent document was published in Apr. 1993.*

(Continued)

*Primary Examiner* — Erica E Cadugan
(74) *Attorney, Agent, or Firm* — Fish & Richardson P.C.

(57) ABSTRACT

A mechanical device is used to change a laser nozzle of a nozzle mount of a laser processing machine. The mechanical device includes a nozzle magazine with at least one nozzle holder for storing a laser nozzle at a nozzle storage location, and a dirt collector. The nozzle holder is movable by means of a positioning device provided for that purpose or alternatively the dirt collector is movable by means of a positioning device provided for that purpose into a stand-by position defined on the mechanical device. The nozzle holder and the dirt collector can also be transferred to a position remote from the stand-by position with the respective positioning device.

15 Claims, 4 Drawing Sheets

(56) References Cited

OTHER PUBLICATIONS

Machine Translation of DE-10056330, which German patent document was published in Mar. 2002.*

Machine Translation of DE-102006028730, which German patent document was published in Jul. 2007.*

Machine Translation of JP-06-023580, which Japanese patent document was published in Feb. 1994.*

European Search Report with English Translation dated Jul. 23, 2008, in related European Patent Application No. 08000521.8, 6 pages.

* cited by examiner

LASER NOZZLE CHANGING DEVICE

CROSS REFERENCE TO RELATED APPLICATION

This application claims priority under 35 U.S.C. §119(a) to European Application No. 08 000 521.8, filed on Jan. 12, 2008, the entire contents of which are hereby incorporated by reference.

TECHNICAL FIELD

The invention relates to a mechanical device changing a laser nozzle of a nozzle mount of a laser processing machine for processing workpieces.

BACKGROUND

JP 06 023580 A discloses a laser processing machine having a mechanical device for changing nozzles on a laser processing head of the laser processing machine. A nozzle magazine of the nozzle changing device is in the form of a turret magazine and has a magazine turret that is rotatable about a turret rotation axis. A plurality of nozzle storage locations are provided on the magazine turret, which follow one another in the direction of rotation of the magazine turret about the turret rotation axis. By rotation of the magazine turret about the turret rotation axis, one of the nozzle storage locations is transferred to a stand-by position. When an empty nozzle storage location is in the stand-by position, the nozzle storage location is able to receive a used laser nozzle that was previously in use on the laser processing head and that is to be dismounted from the nozzle mount of the laser processing head. When a nozzle storage location with a substitute laser nozzle assumes the stand-by position, the substitute laser nozzle may be mounted on the laser processing head as a replacement for a previously dismounted, used laser nozzle.

SUMMARY

In one general aspect, a mechanical device is used to change a laser nozzle of a nozzle mount of a laser processing machine. The mechanical device includes a nozzle magazine having at least one nozzle holder configured to hold a laser nozzle; a dedicated positioning device configured to move the nozzle holder into a stand-by position towards the nozzle mount of the laser processing machine or into a position remote from the stand-by position; a dedicated dirt collector configured to receive dirt particles produced during laser processing and distinct from the nozzle holder, and a dedicated positioning device configured to move the dirt collector into the stand-by position in place of the nozzle holder and into a position remote from the stand-by position.

Implementations can include one or more of the following features. For example, the nozzle holder and the dirt collector can be connected to move together.

The nozzle holder and the dirt collector can be mounted on a common support and the support is movable by means of a positioning drive of the positioning device for the nozzle holder and by means of a positioning drive of the positioning device for the dirt collector into positions in which the nozzle holder and the dirt collector have each been moved into the stand-by position or into a position remote from the stand-by position. The positioning drive of the positioning device for the nozzle holder can be the positioning drive of the positioning device for the dirt collector.

The positioning device for the nozzle holder and the positioning device for the dirt collector can have a common positioning drive motor.

One or more of the nozzle holder and the dirt collector can be movable about a circular path into the stand-by position or into a position remote from the stand-by position.

The mechanical device can include a supporting turret that provides a common support for the nozzle holder and the dirt collector. The supporting turret is movable by means of one or more of a positioning drive of the positioning device for the nozzle holder and a positioning drive of the positioning device for the dirt collector about a turret rotation axis into rotational positions in which the nozzle holder and the dirt collector have each been moved into the stand-by position or into a position remote from the stand-by position.

The dirt collector can form a dirt passage through which dirt can pass. The dedicated positioning device configured to move nozzle holder can be the dedicated positioning device that is configured to move the dirt collector.

In another general aspect, a laser processing machine for processing workpieces includes a nozzle mount for a laser nozzle, and a mechanical device configured to change the laser nozzle of the nozzle mount. The mechanical device includes a nozzle magazine having at least one nozzle holder configured to hold a laser nozzle; a dedicated positioning device configured to move the nozzle holder into a stand-by position towards the nozzle mount of the laser processing machine or into a position remote from the stand-by position; a dedicated dirt collector configured to receive dirt particles produced during laser processing and distinct from the nozzle holder, and a dedicated positioning device configured to move the dirt collector into the stand-by position in place of the nozzle holder and into a position remote from the stand-by position.

The dirt collector can be moved into the stand-by position on the mechanical device in place of a nozzle holder. Use is made of this possibility especially in operating conditions of the laser processing machine in which dirt appears to a greater extent at the stand-by position. This is the case, for example, when a normal workpiece machining operation is being performed by means of the laser processing machine. Examples of the dirt in question are slag and metal spatters as are produced in the laser processing of metal sheets by cutting. The dirt collector disposed in the stand-by position receives the resulting dirt particles while the nozzle holder or holders of the nozzle magazine is remote from the stand-by position near the cutting head and consequently protected from undesirable pollution. In that manner, both pollution to empty nozzle holders and pollution to nozzle holders occupied by a laser nozzle are avoided. Pollution to empty nozzle holders could, for example, interfere with proper seating of a used laser nozzle at the relevant nozzle storage location. Pollution of nozzle holders occupied by a substitute laser nozzle could lead, in particular, to problems in mounting the relevant laser nozzle on the nozzle mount of the laser processing machine.

The mechanical device provides simple control options for transferring the dirt collector and the nozzle holder to the stand-by position or to a position remote from the stand-by position.

The mechanical device provides a constructionally simple and inexpensive configuration of the positioning drive of the dirt collector and the nozzle holder.

Another advantage of the mechanical device is that the nozzle holder and/or the dirt collector is or are movable along a circular path into the stand-by position or into a position remote from the stand-by position. The circular geometry of the movement path of the dirt collector and the nozzle holder makes possible a compact construction of the overall arrangement.

A constructionally simple possible method of implementing a circular positioning movement of the dirt collector and the nozzle holder is provided.

The dirt collector can form a dirt passage through which dirt passes through the mechanical device. In that manner, dirt particles can in a simple manner be taken away from the immediate vicinity of the mechanical device to areas where they cannot interfere with the operability of the mechanical device.

The details of one or more embodiments of the invention are set forth in the accompanying drawings and the description below. Other features and advantages of the invention will be apparent from the description and drawings, and from the claims.

DETAILED DESCRIPTION

Figure 3:
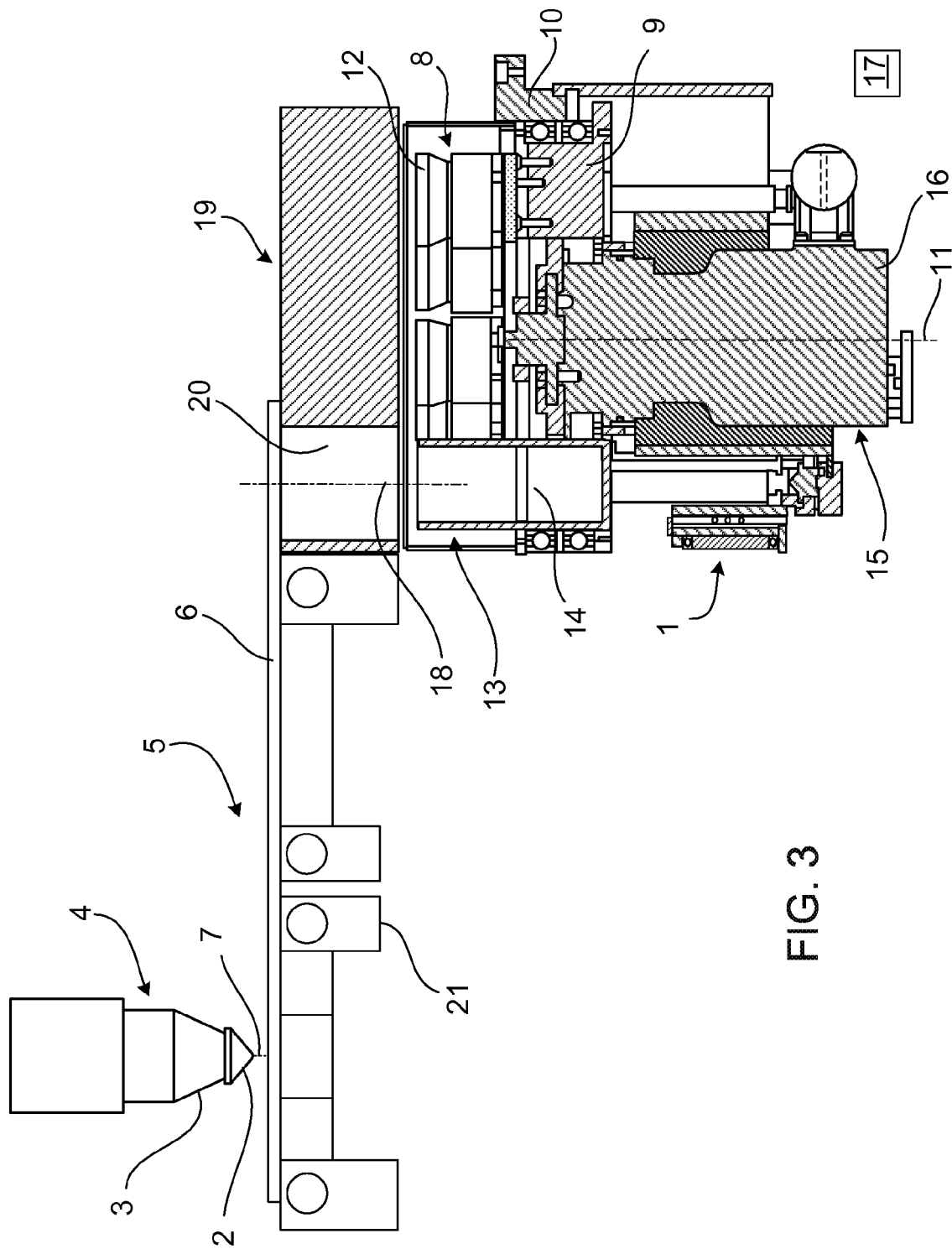
FIG. 3 is a side cross-sectional view of a laser processing machine with a mechanical nozzle changing device in the state shown in FIG. 1.

A nozzle changing device 1 shown in FIGS. 1-4 is used for changing laser nozzles 2 of a nozzle mount 3, which is provided on a laser processing head 4 of a laser processing machine 5. The laser nozzles 2 are changed by one or more of dismounting a laser nozzle 2 from the nozzle mount 3 and mounting a new laser nozzle 2 to the nozzle mount 3. As shown in FIG. 3, in normal operation of the laser processing machine 5, a metal sheet 6 is cut with a laser cutting beam 7.

The nozzle changing device 1 has a nozzle magazine 8 with a supporting turret 9 that is rotatable on and relative to a housing 10 of the nozzle changing device 1 about a turret rotation axis 11 and therefore the supporting turret 9 is positionable in direction of rotation 110 about the turret rotation axis 11. The supporting turret 9 is provided with a plurality of nozzle holders 12 at nozzle storage locations of the nozzle magazine 8. In addition, a dedicated dirt collector 13 is mounted on the supporting turret 9. The dedicated dirt collector 13 can be a simple physical structure (for example, a cylinder) that lacks the physical features that enable the nozzle holders 12 to hold a nozzle 2. The nozzle holders 12 and the dirt collector 13 are disposed on the supporting turret 9 in offset relationship to one another in the direction of rotation 10 about the turret rotation axis 11. For simplicity, in FIGS. 1 and 2, the nozzle holders 12 are shown empty. In operational use of the nozzle changing device 1 on the laser processing machine 5, at least one of the nozzle holders 12 holds or receives a laser nozzle 2 that is to be used as a replacement at the laser processing head 4.

The dirt collector 13 on the supporting turret 9 forms a dirt passage 14 that allows dirt particles to pass through in a direction parallel to the turret rotation axis 11 (FIG. 3). A positioning device 15 serves to adjust the rotational position of the supporting turret 9 about the turret rotation axis 11. The positioning device 15 includes an electric positioning drive motor 16 that is controlled by a numerical drive control 17. The control 17 can be integrated in the numerical control of the laser processing machine 5 and/or it can be integrated in a computer numerical control (CNC) system.

Figure 1:
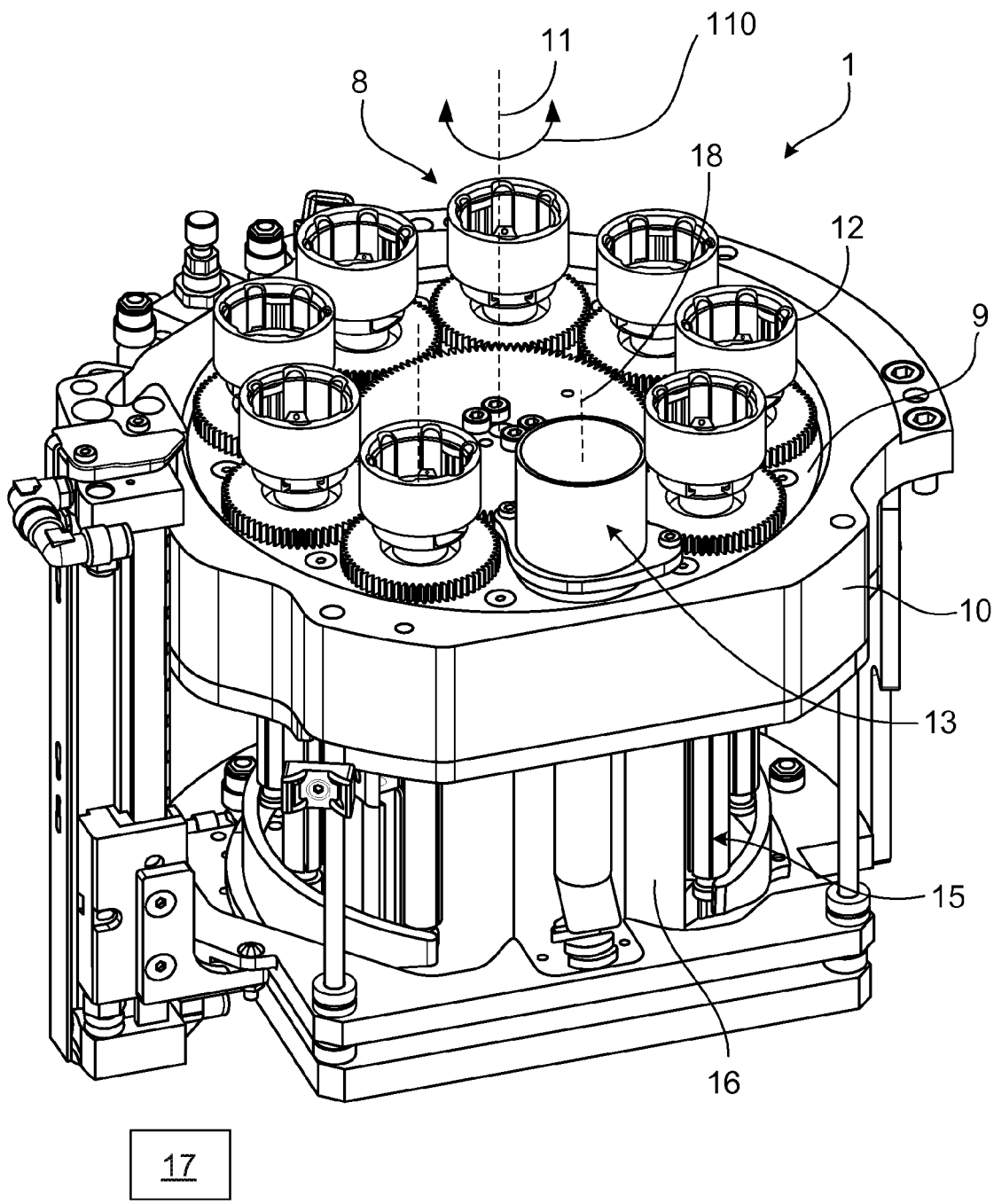
FIG. 1 is a perspective view of a mechanical nozzle changing device with a nozzle magazine with nozzle storage locations, and with a dirt collector in the stand-by position.
Figure 2:
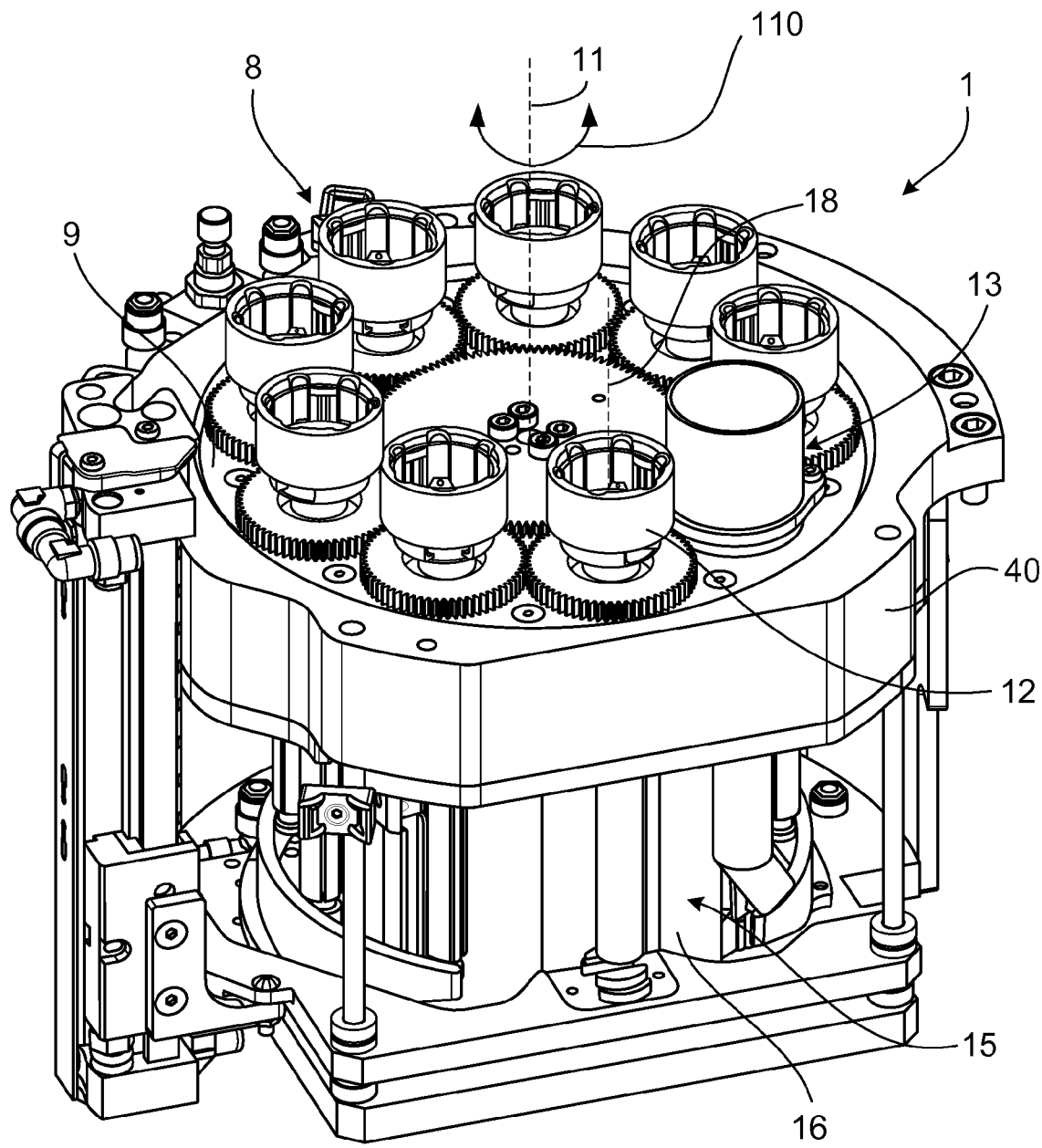
FIG. 2 is a perspective view of the mechanical nozzle changing device shown in FIG. 1, with a nozzle storage location of the nozzle magazine in the stand-by position.

A stand-by position 18 is defined on the nozzle changing device 1. The stand-by position 18 is a position that is towards the nozzle mount 3 of the laser processing machine 5. In FIG. 1, the stand-by position 18 is assumed by the dirt collector 13, more specifically by the longitudinal axis of the dirt passage 14 of the dirt collector 13. According to FIG. 2, a nozzle holder 12, or rather the central axis of the nozzle holder 12, immediately adjacent to the dirt collector 13, has been moved into the stand-by position 18. The positioning of both the dirt collector 13 and the nozzle holder 12 in the stand-by position 18 is performed by the positioning drive motor 16, which is controlled by the numerical drive control 17.

The operating condition shown in FIG. 1 for the nozzle changing device 1 is associated with normal cutting operation of the laser processing machine 5. The respective situation at the laser processing machine 5 is illustrated in FIG. 3.

Accordingly, during processing of the metal sheet 6 by cutting, the nozzle changing device 1 is situated with the dirt collector 13 beneath a passage opening 20 provided in a workpiece support 19 of the laser processing machine 5. Dirt particles, for example, slag or metal spatters, which are produced at the processing site of the laser cutting beam 7 and which reach the passage opening 20 of the workpiece support 19, are able to pass by gravity through the nozzle changing device 1 disposed beneath the workpiece support 19 through the dirt passage 14 of the dirt collector 13. In this way, the dirt particles in question are prevented from settling on the nozzle changing device 1 and then interfering with the operability thereof.

Figure 4:
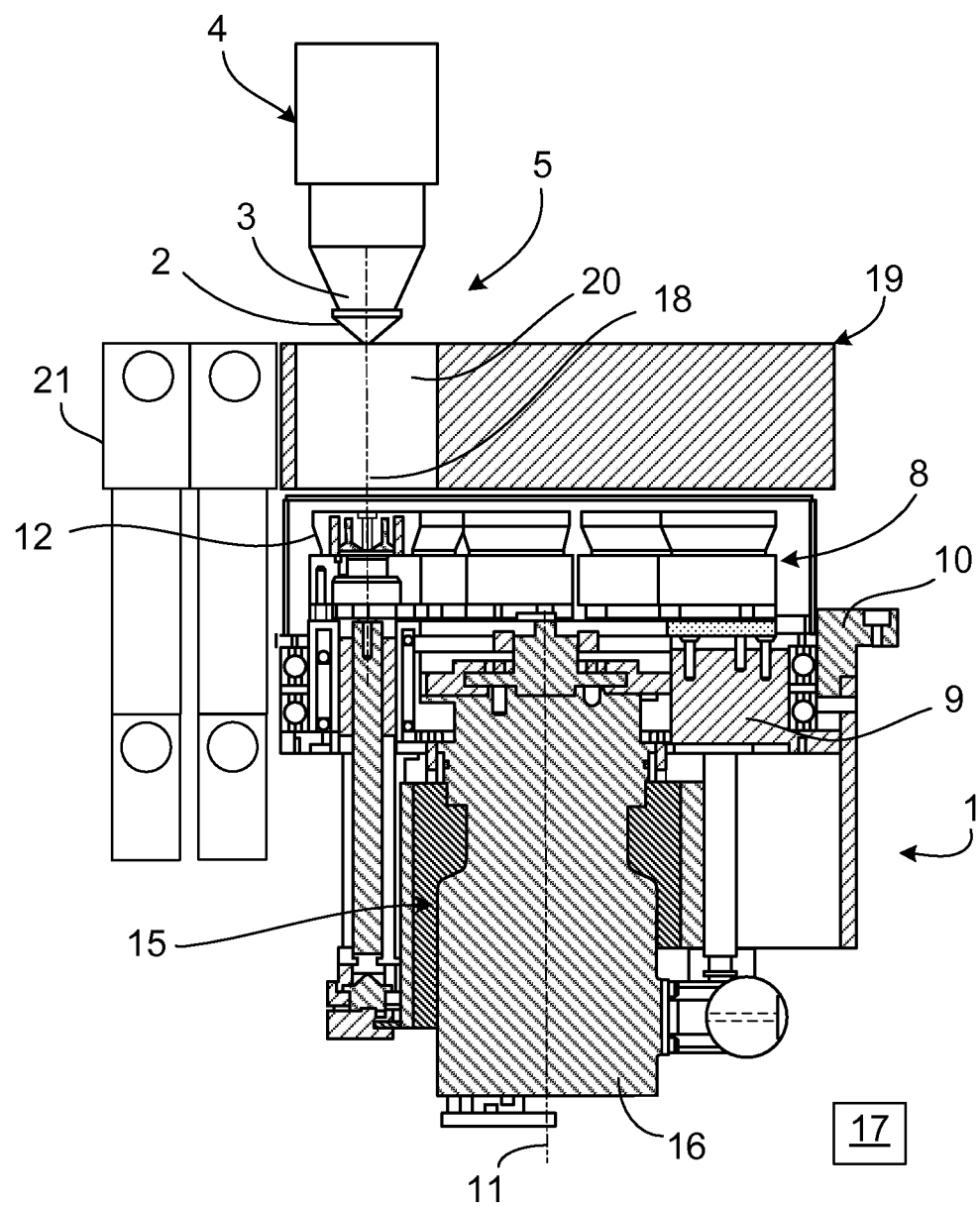
FIG. 4 is a side cross-sectional view of a laser processing machine with a mechanical nozzle changing device in the state shown in FIG. 2.

If the laser nozzle 2 that is mounted on the laser processing head 4 is to be exchanged for another laser nozzle 2, for example, on account of a change of the material to be processed or because of pollution, first, an empty nozzle holder 12 is moved into the stand-by position 18 on the nozzle changing device 1. For that purpose, the positioning drive motor 16 of the nozzle changing device 1 is actuated under numerical control. Consequently, the positioning drive motor 16 turns the supporting turret 9 through a defined angle of rotation along the rotation direction 110 about the turret rotation axis 11. As a result, the dirt collector 13 leaves the stand-by position 18 and an empty nozzle holder 12, which follows the dirt collector 13 on the supporting turret 9, enters the stand-by position 18. At the same time, a trapdoor-like discharge flap 21, which is provided on the workpiece support 19 for the purpose of discharging products of the workpiece processing operation, is opened starting from the closed position shown in FIG. 3. With the discharge flap 21 open, the laser processing head 4 and the workpiece support 19 are moved relative to each other until the laser processing head 4 with the laser nozzle 2 that is to be dismounted arrives above the passage opening 20 in the workpiece support 19 and thus also above the empty nozzle holder 12, which is in the stand-by position 18, and, as discussed above, is the position that is towards the nozzle mount 3 of the laser processing head 4. The situation shown in FIG. 4 is thus obtained.

Starting from that situation, the used laser nozzle 2 on the laser processing head 4 is inserted through the passage opening 20 and into the nozzle holder 12 arranged opposite it and is screwed out of the nozzle mount 3 of the laser processing head 4 by rotation of the nozzle holder 12. Then, the nozzle holder 12 occupied by the substitute laser nozzle 2 is moved by means of the positioning drive motor 16 about the turret rotation axis 11 into the stand-by position 18. The substitute laser nozzle 2 is then screwed into the nozzle mount 3 of the laser processing head 4 through the passage opening 20 in the workpiece support 19.

When the nozzle change has been completed, the positioning drive motor 16 turns the dirt collector 13 back into the stand-by position 18 before the situation shown in FIG. 3 is finally produced again by closing of the discharge flap 21 and by relative movement of laser processing head 4 and workpiece support 19. The dirt collector 13 then resumes its rotational position associated with normal cutting operation of the laser processing machine 5. The nozzle holders 12 of the nozzle magazine 8 are remote from the stand-by position 18 and are protected against harmful effects of the workpiece processing operation.

Other Embodiments

A number of embodiments have been described. Nevertheless, it will be understood that various modifications may be made without departing from the spirit and scope of the invention. Accordingly, other embodiments are within the scope of the following claims.

What is claimed is:

1. A mechanical device for changing a laser nozzle of a nozzle mount of a laser processing machine for processing workpieces, the mechanical device comprising:
    a nozzle magazine having a nozzle holder having physical features configured to hold a laser nozzle; and
    a dedicated positioning device configured to move the nozzle holder into a stand-by position towards the nozzle mount of the laser processing machine or into a position remote from the stand-by position, wherein when the nozzle holder is empty and is in the stand-by position, the nozzle holder is able to receive a used laser nozzle from the nozzle mount of the laser processing machine, and when the nozzle holder is holding a substitute laser nozzle and is in the stand-by position, the substitute laser nozzle is able to be mounted on the nozzle mount of the laser processing machine;
    the nozzle magazine also having a dedicated dirt collector that lacks the physical features and that is configured to receive dirt particles produced during laser processing by forming a dirt passage through which dirt can pass and that is distinct from the nozzle holder,
    wherein the dedicated positioning device includes a positioning drive motor that is controlled by a numerical drive control, the dedicated positioning device thus being configured to move the dirt collector with the dirt passage formed thereby into the stand-by position in place of the nozzle holder and into a position remote from the stand-by position,
    wherein the numerical drive control is configured to control the positioning drive motor of the dedicated positioning device in such a way that the dirt passage formed by the dirt collector is moved into the stand-by position in place of the nozzle holder so that the dirt passage is disposed in the stand-by position when a workpiece processing operation is performed by the laser processing machine.

2. The mechanical device of claim 1, wherein the nozzle holder and the dirt collector are connected to move together.

3. The mechanical device of claim 1, wherein the nozzle holder of the nozzle magazine and the dirt collector are mounted on a common support and the common support is movable by the positioning drive motor of the positioning device into positions in which the nozzle holder and the dirt passage formed by the dirt collector have each been moved into the stand-by position or into the position remote from the stand-by position.

4. The mechanical device of claim 3, the nozzle magazine further comprising a supporting turret that provides the common support for the nozzle holder and the dirt collector, wherein the supporting turret is movable by the positioning drive motor of the positioning device about a turret rotation axis into rotational positions in which the nozzle holder and the dirt passage formed by the dirt collector have each been moved into the stand-by position or into the position remote from the stand-by position.

5. The mechanical device of claim 1, wherein one or more of the nozzle holder and the dirt passage formed by the dirt collector is movable along a circular path into the stand-by position or into the position remote from the stand-by position.

6. The mechanical device of claim 1, wherein the nozzle magazine has a plurality of nozzle holders.

7. A laser processing machine for processing workpieces, the laser processing machine comprising:
    a nozzle mount for a laser nozzle, and
    a mechanical device configured to change the laser nozzle of the nozzle mount, the mechanical device comprising:
        a nozzle magazine having a nozzle holder having physical features configured to hold a laser nozzle; and
        a dedicated positioning device configured to move the nozzle holder into a stand-by position towards the nozzle mount of the laser processing machine or into a position remote from the stand-by position, wherein when the nozzle holder is empty and is in the stand-by position, the nozzle holder is able to receive a used laser nozzle from the nozzle mount of the laser processing machine, and when the nozzle holder is holding a substitute laser nozzle and is in the stand-by position, the substitute laser nozzle is able to be mounted on the nozzle mount of the laser processing machine;
    the nozzle magazine also having a dedicated dirt collector that lacks the physical features and that is configured to receive dirt particles produced during laser processing by forming a dirt passage through which dirt can pass and that is distinct from the nozzle holder,
    wherein the dedicated positioning device includes a positioning drive motor that is controlled by a numerical drive control, the dedicated positioning device thus being configured to move the dirt collector with the dirt passage formed thereby into the stand-by position in place of the nozzle holder and into a position remote from the stand-by position,
    wherein the numerical drive control is configured to control the positioning drive motor of the dedicated positioning device in such a way that the dirt passage formed by the dirt collector is moved into the stand-by position in place of the nozzle holder so that the dirt passage is disposed in the stand-by position when a workpiece processing operation is performed by the laser processing machine.

8. The laser processing machine of claim 7, wherein the nozzle holder and the dirt collector are connected to move together.

9. The laser processing machine of claim 7, wherein the nozzle holder of the nozzle magazine and the dirt collector are mounted on a common support and the common support is movable by the positioning drive motor of the positioning device into positions in which the nozzle holder and the dirt passage formed by the dirt collector have each been moved into the stand-by position or into the position remote from the stand-by position.

10. The laser processing machine of claim 9, the nozzle magazine further comprising a supporting turret that provides the common support for the nozzle holder and the dirt collector, wherein the supporting turret is movable by the positioning drive motor of the positioning device about a turret rotation axis into rotational positions in which the nozzle holder and the dirt passage formed by the dirt collector have each been moved into the stand-by position or into the position remote from the stand-by position.

11. The laser processing machine of claim 7, wherein one or more of the nozzle holder and the dirt passage formed by the dirt collector is movable along a circular path into the stand-by position or into the position remote from the stand-by position.

12. The laser processing machine of claim 7, wherein the nozzle holder or the dedicated dirt collector, when located in the stand-by position, is located beneath an opening in a workpiece support member of the laser processing machine.

13. The laser processing machine of claim 7, wherein the nozzle magazine has a plurality of nozzle holders.

14. A laser processing machine for processing workpieces, the laser processing machine comprising:
    a nozzle mount for a laser nozzle, and
    a mechanical device configured to change the laser nozzle of the nozzle mount, the mechanical device comprising:
        a nozzle magazine having a nozzle holder having physical features configured to hold a laser nozzle; and
        a dedicated positioning device configured to move the nozzle holder into a stand-by position towards the nozzle mount of the laser processing machine or into a position remote from the stand-by position;
    the nozzle magazine also having a dedicated dirt collector that lacks the physical features and that is configured to receive dirt particles produced during laser processing by forming a dirt passage through which dirt can pass and that is distinct from the nozzle holder,
    wherein the dedicated positioning device includes a positioning drive motor that is controlled by a numerical drive control, the dedicated positioning device thus being configured to move the dirt collector with the dirt passage formed thereby into the stand-by position in place of the nozzle holder and into a position remote from the stand-by position,
    wherein the nozzle holder or the dedicated dirt collector, when located in the stand-by position, is located beneath an opening in a workpiece support member of the laser processing machine, and
    wherein the numerical drive control is configured to control the positioning drive motor of the dedicated positioning device in such a way that the dirt passage formed by the dirt collector is moved into the stand-by position in place of the nozzle holder so that the dirt passage is disposed in the stand-by position when a workpiece processing operation is performed by the laser processing machine.

15. The laser processing machine of claim 14, wherein the nozzle magazine has a plurality of nozzle holders.

* * * * *